United States Patent
Kim

(10) Patent No.: US 7,286,301 B2
(45) Date of Patent: Oct. 23, 2007

(54) CAMERA ZOOM DEVICE AND METHOD FOR A MOBILE COMMUNICATION TERMINAL

(75) Inventor: Dae-Sung Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/283,628

(22) Filed: Nov. 21, 2005

(65) Prior Publication Data

US 2006/0109566 A1    May 25, 2006

(30) Foreign Application Priority Data

Nov. 24, 2004  (KR) ...................... 10-2004-0097130

(51) Int. Cl.
*G02B 15/14* (2006.01)
*G03B 37/02* (2006.01)
(52) U.S. Cl. ........................ 359/694; 396/20
(58) Field of Classification Search ........ 359/649–662, 359/694; 355/72, 55; 396/20, 78; 348/211, 348/143
See application file for complete search history.

(56) References Cited

U.S. PATENT DOCUMENTS 5,153,638 A * 10/1992 Sakakibara ............... 355/55
2004/0160635 A1* 8/2004 Ikeda et al. ............... 358/1.15

* cited by examiner

*Primary Examiner*—M. Hasan
(74) *Attorney, Agent, or Firm*—The Farrell Law Firm, P.C.

(57) ABSTRACT

A camera zoom device and method for a mobile communication terminal. The camera zoom device includes a zoom dial rotating about a rotation axis; a zoom dial rotation sensing unit for sensing a rotation angle of the zoom dial; a zoom controlling unit for determining a zoom direction (zoom-in or out) and a zoom magnification depending on the sensed rotation angle; and a zoom lens driving unit for driving a zoom lens unit depending on the zoom direction and the zoom magnification. The camera zoom device zooms in or out depending on the rotation angle of the zoom dial, thereby enabling a convenient and prompt camera zoom function, and preventing lens shaking that is commonly caused when the zoom function is performed by pressing keys.

8 Claims, 5 Drawing Sheets

CAMERA ZOOM DEVICE AND METHOD FOR A MOBILE COMMUNICATION TERMINAL

PRIORITY

This application claims priority under 35 U.S.C. § 119 to an application entitled "Camera Zoom Device and Method for Mobile Communication Terminal" filed in the Korean Intellectual Property Office on Nov. 24, 2004 and assigned Ser. No. 2004-97130, the contents of which are incorporated herein by reference.

BACKGROUND OF THE INVENTION

1. Field of the Invention

The present invention relates generally to a mobile communication terminal, and in particular, to a camera zoom device and method for a mobile communication terminal including a camera.

2. Description of the Related Art

Due to the technological developments in portable terminals and the miniaturization of cameras, it has become possible to provide a mobile communication terminal including a camera. Accordingly, a camera phone has become very popular. Additionally, mobile communication terminals having a zoom camera function are also available.

In general, the mobile communication terminal having the zoom camera function includes a zoom key for zooming in or out using. However, a zoom-in or out method using the zoom key has a disadvantage in that it is inconvenient and time consuming for a user to separately press the zoom key whenever in order to zoom in or out. For example, when the user photographs the object, the user focuses a camera lens to an object and presses the zoom key several times as necessary.

Additionally, such a zoom-in or out method using the zoom key has a drawback in that the camera lens is shaken due to user's hands trembling, thereby resulting in out of focus and inexact photographs.

SUMMARY OF THE INVENTION

It is, therefore, an object of the present invention to provide a camera zoom device and method for a mobile communication terminal in which a zoom dial is used, instead of a zoom key, to perform a convenient and prompt zooming function and prevent camera shaking that is often caused by a key input.

It is another object of the present invention to provide a camera zoom device and method for a mobile communication terminal in which a camera zoom-in or out is performed depending on a rotation angle of a zoom dial to perform a convenient and prompt zooming function and prevent camera shaking during photographing.

To achieve the above and other objects, there is provided a camera zoom device for a mobile communication terminal. The device includes: a zoom dial that rotates about a rotation axis; a zoom dial rotation sensing unit for sensing a rotation angle of the zoom dial; a zoom controlling unit for determining a zoom direction (i.e., zoom-in or out) and a zoom magnification depending on the sensed rotation angle; and a zoom lens driving unit for driving a zoom lens unit, depending on the zoom direction and the zoom magnification.

In another aspect of the present invention, there is provided a camera zoom method for a mobile communication terminal. The method includes the steps of: sensing a rotation angle of a zoom dial in a camera mode; calculating a zoom direction and a zoom magnification, depending on the rotation angle; and driving a zoom lens unit, depending on the calculated zoom direction and zoom magnification.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
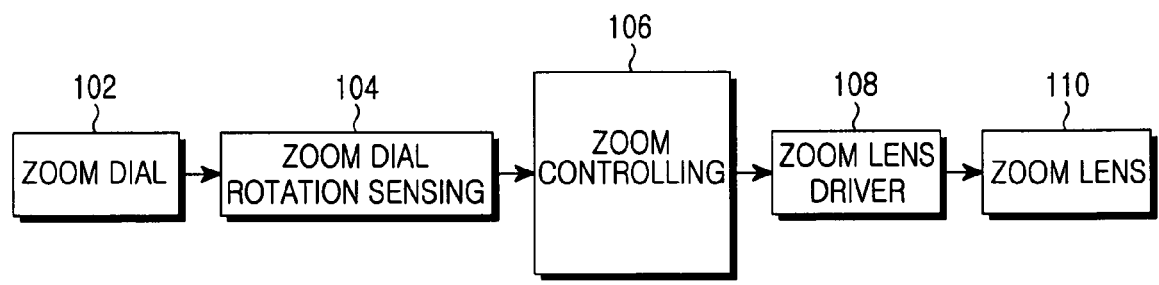
FIG. 1 is a block diagram illustrating a camera zoom device according to an embodiment of the present invention.

Preferred embodiments of the present invention will now be described in detail herein below with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 is a block diagram illustrating a camera zoom device according to an embodiment of the present invention. Referring to FIG. 1, the inventive camera zoom device includes a zoom dial 102, a zoom dial rotation sensing unit 104, a zoom controlling unit 106, a zoom lens driving unit 108, and a zoom lens unit 110. The zoom dial 102 is an interface for a user to control a zoom-in or out and a zoom magnification. More specifically, the zoom dial 102 rotates between a ground axis (y-axis) and a gravitational axis (x-axis) vertical to the ground axis (y-axis) with respect to a rotation axis (z-axis). The zoom dial rotation sensing unit 104 senses a rotation angle depending on a rotation of the zoom dial 102.

Figure 2:
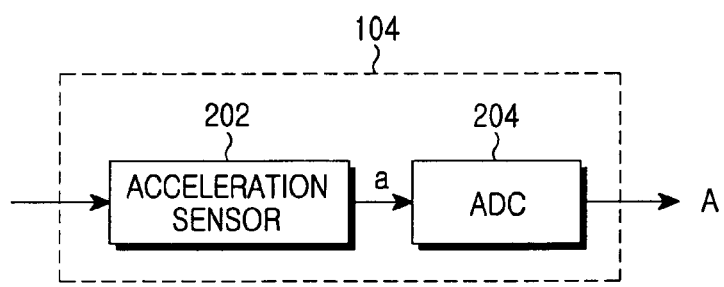
FIG. 2 is a detailed diagram illustrating a zoom dial rotation sensing unit of a camera zoom device according to an embodiment of the present invention.

FIG. 2 is a detailed diagram illustrating the zoom dial rotation sensing unit 104 of the camera zoom device according to an embodiment of the present invention. Referring to FIG. 2, the inventive zoom dial rotation sensing unit 104 includes an acceleration sensor 202 and an Analog-to-Digital Converter (ADC) 204. The acceleration sensor 202 senses the rotation of the zoom dial 102 to output the rotation angle (a). The rotation angle (a) represents the amount the zoom dial 102 is rotated from the direction of the reference axis (x-axis) to the direction of the ground axis (y-axis). The ADC 204 converts the analog rotation angle (a) into a digital rotation angle (A).

Referring again to FIG. 1, the zoom controlling unit 106 determines the zoom-in or out and the zoom magnification depending on the rotation angle (A) of the zoom dial 102, which is output from the zoom dial rotation sensing unit 104. The zoom lens driving unit 108 drives the zoom lens unit 110 depending on the zoom-in or out and the zoom magnification, which are determined in the zoom controlling unit 106. The zoom lens unit 110 zooms in or out by the zoom lens driving unit 108.

Figure 3:
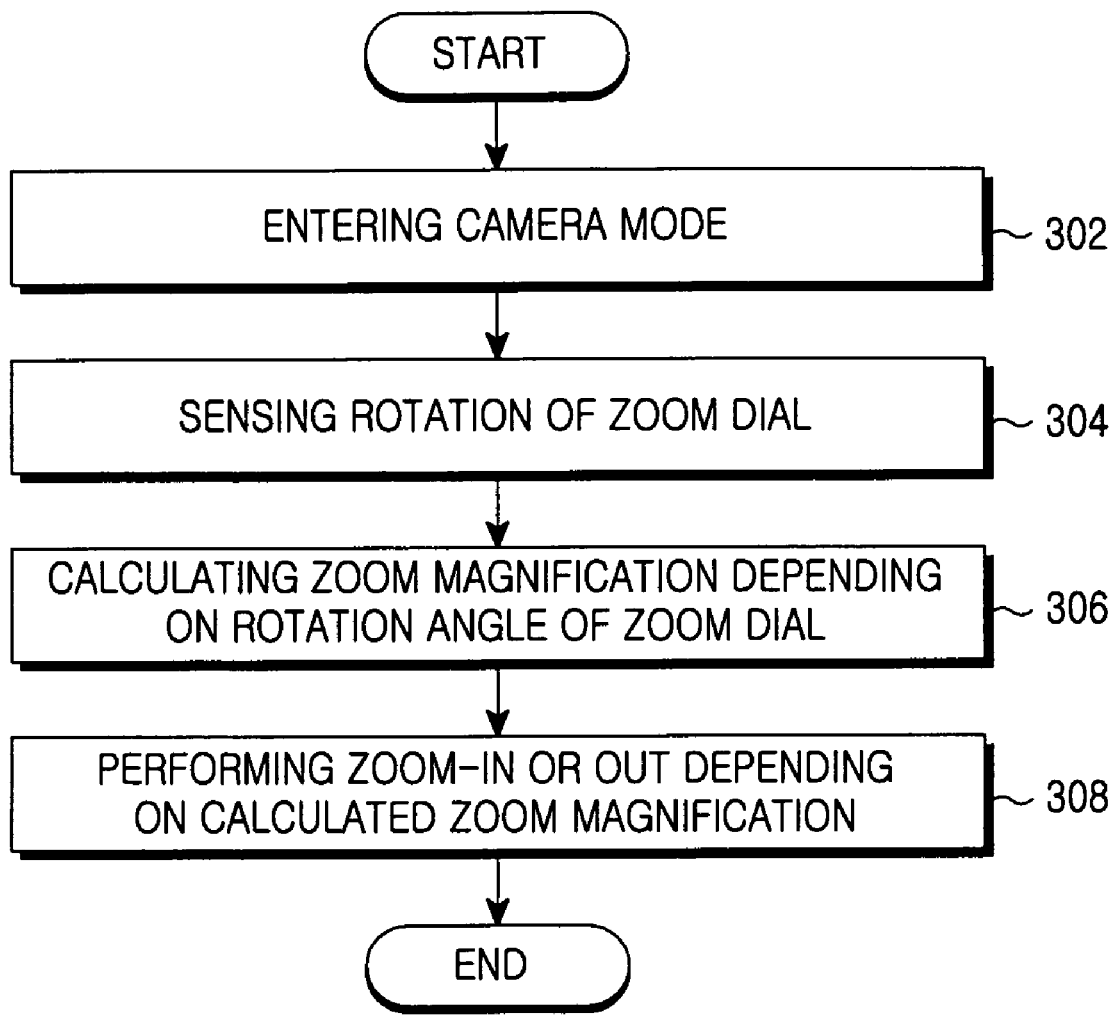
FIG. 3 is a flowchart illustrating a camera zoom method according to an embodiment of the present invention.

FIG. 3 is a flowchart illustrating a camera zoom method according to an embodiment of the present invention. Referring to FIG. 3, in step 302, the inventive camera zoom device determines that the mobile communication terminal is currently in a camera mode. In step 304, the camera zoom device senses the rotation of the zoom dial 102. That is, the camera zoom device senses the rotation angle (A) depending on the user's rotation of the zoom dial 102.

In step 306, the camera zoom device calculates the zoom magnification depending on the rotation of the zoom dial 102. That is, the camera zoom device determines the zoom magnification depending on the rotation angle (A) of the zoom dial 102. In step 308, the camera zoom device zooms in or out depending on the determined zoom magnification.

According to the present invention, the zoom dial 102 of the camera zoom device can be embodied using a partial body of the mobile communication terminal.

Figure 4:
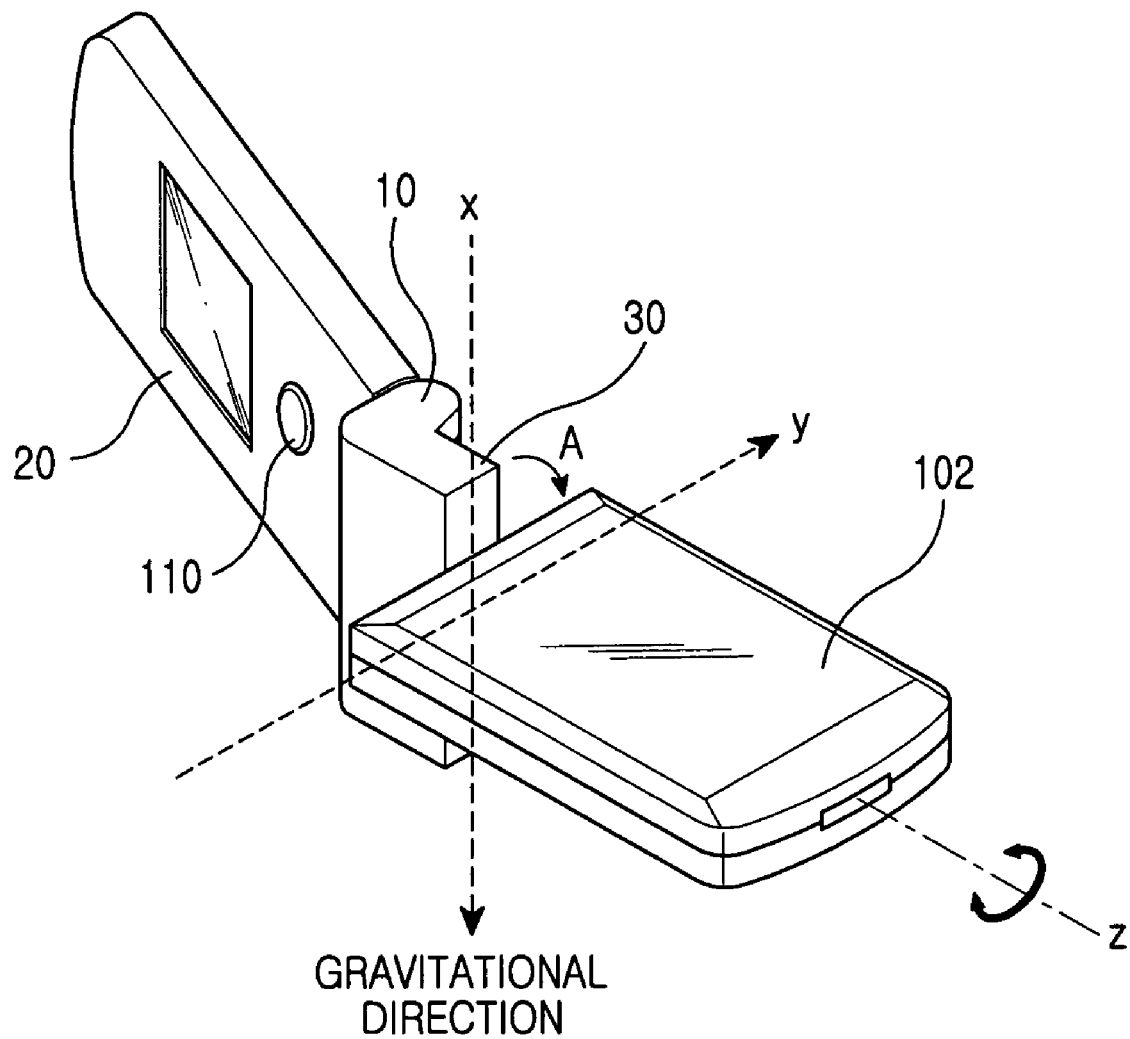
FIGS. 4 and 5 are schematic exterior views illustrating a mobile communication terminal according to an embodiment of the present invention.
Figure 5:
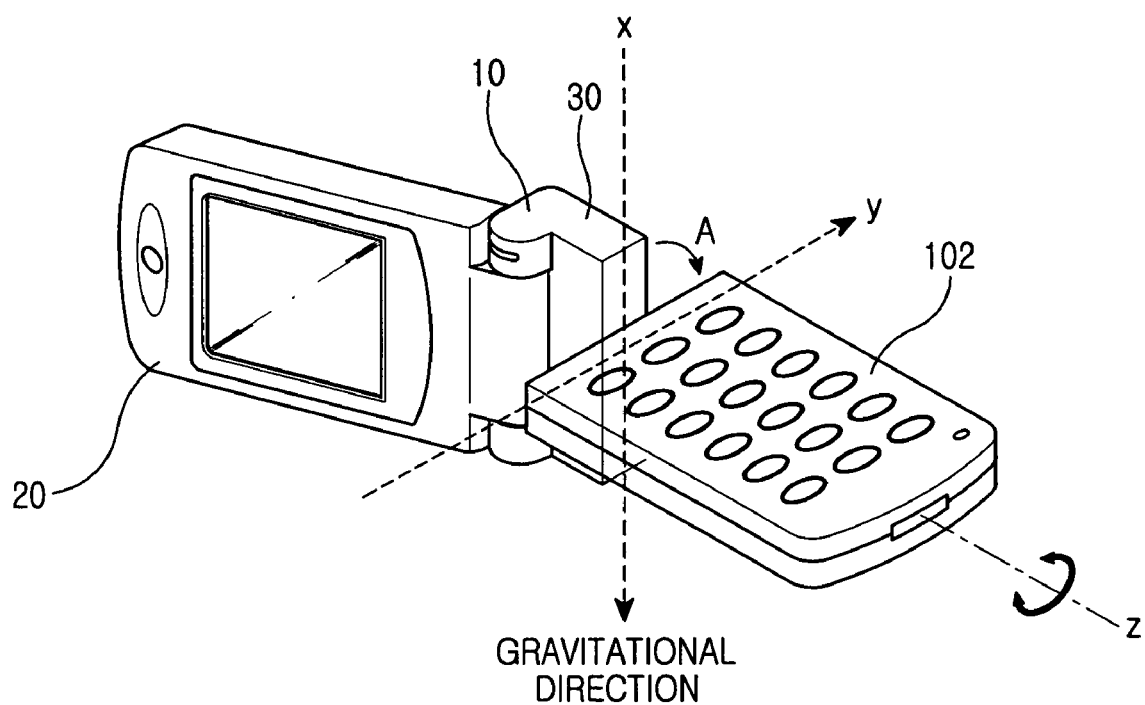

FIGS. 4 and 5 are schematic exterior views illustrating the mobile communication terminal according to an embodiment of the present invention. Referring first to FIG. 4, the inventive mobile communication terminal includes a sub body 20 and a main body 30. In the present embodiment, the mobile communication terminal is a folder type terminal enabling the sub body 20 to be opened and closed with respect to the main body 30 by a hinge part 10.

More specifically, FIG. 4 illustrates a mobile communication terminal in which the zoom dial 102 is embodied using a part of the main body 30, by way of example. The zoom dial 102 can be rotated from the direction of the x-axis (gravitational direction) to the direction of the y-axis (ground direction) with respect to the z-axis (rotation axis). The acceleration sensor 202 using at least one axis is built in the zoom dial 102.

Referring to FIG. 5, when a part of the main body 30 (that is, the zoom dial 102) is maintained to be vertical with the ground axis (y-axis), for example, when it is maintained to be in parallel with the x-axis, the zoom dial 102 gets to be in the same direction as the gravitational direction, thereby minimizing the rotation angle (A) of the acceleration sensor 202. However, if the zoom dial 102 is rotated from the direction of the x-axis to the inward (−y-axis) or to the outward (+y-axis), the zoom dial 102 is positioned in a different direction from the gravitational direction, thereby varying a gravitational acceleration. Accordingly, the acceleration sensor 202 outputs the rotation angle (A).

As the gravitational acceleration is greatly varied, the rotation angle (A) is increased. Further, when the zoom dial 102 is rotated from the direction of the x-axis to the outward (+y-axis), the acceleration sensor 202 outputs a zoom-in value. However, when the zoom dial 102 is rotated from the direction of the x-axis to the inward (−y-axis), the acceleration sensor 202 outputs a zoom-out value.

Figure 6A:
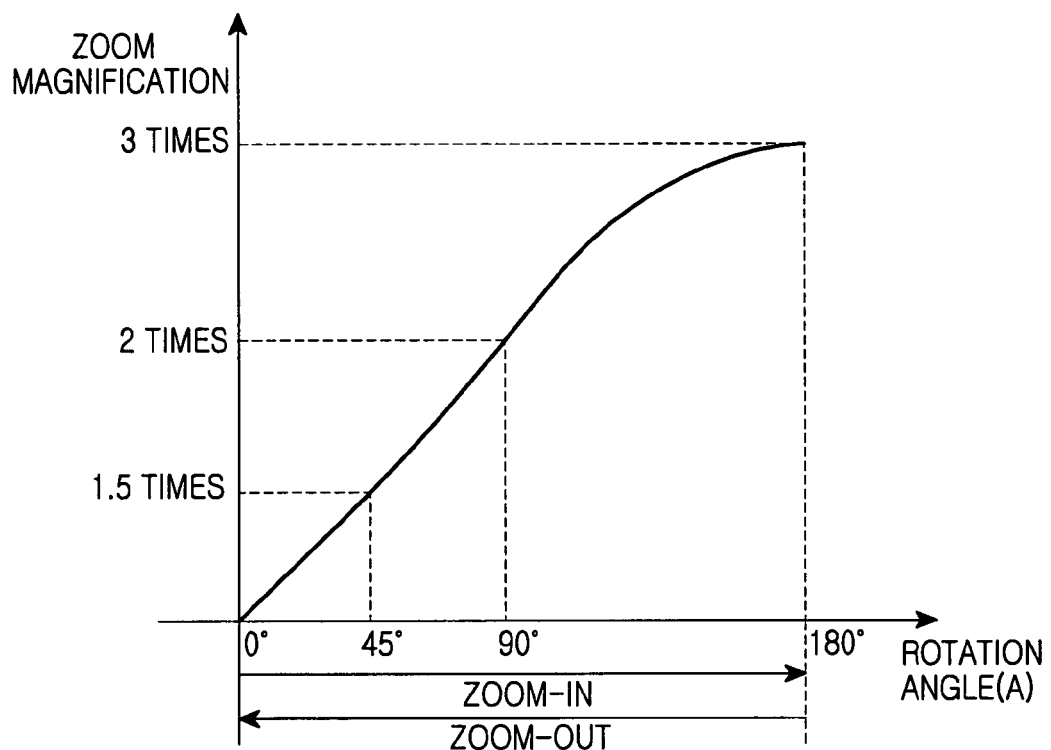
FIGS. 6A and 6B are graphs illustrating a zoom magnification depending on a rotation angle of a zoom dial according to an embodiment of the present invention.
Figure 6B:
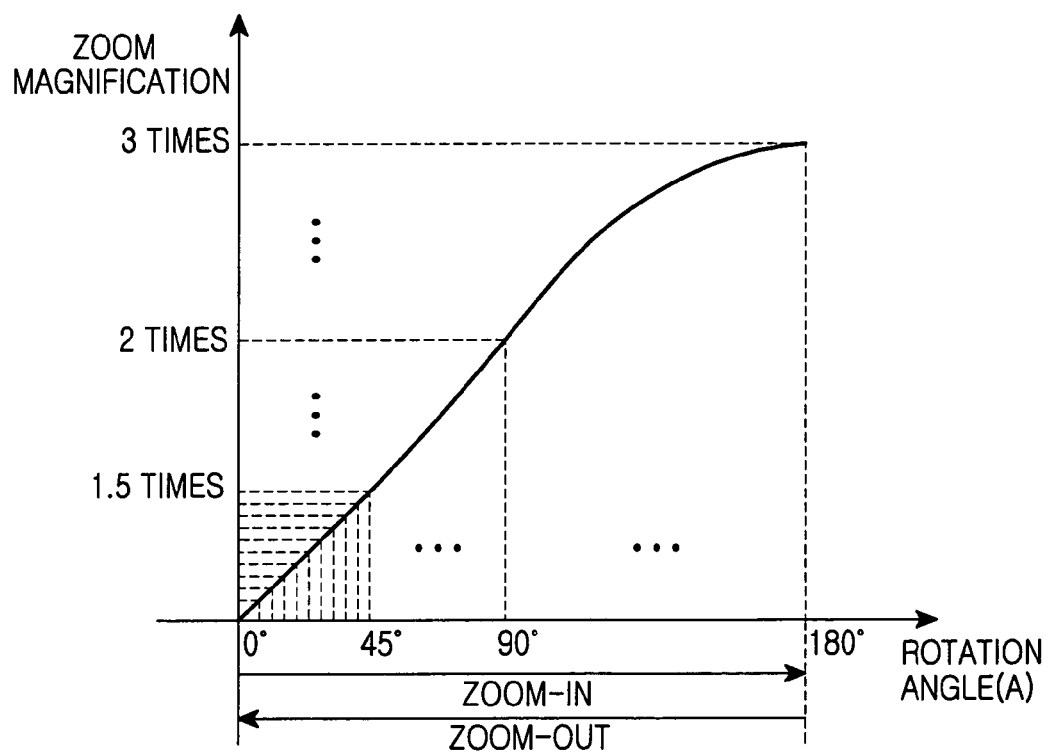

FIGS. 6A and 6B are graphs illustrating the zoom magnification depending on the rotation angle (A) of the zoom dial 102 according to an embodiment of the present invention. More specifically, in FIGS. 6A and 6B, it is assumed that the rotation angle (A) is zero when the zoom dial 102 is maintained in parallel with the x-axis. However, as the zoom dial 102 is rotated from 0 degree to 180 degree, the rotation angle (A) is gradually increased. According to an embodiment of the present invention, the zoom magnification is determined depending on the rotation angle (A).

Accordingly, the zoom magnification can be linearly or stepwise determined depending on a variation characteristic of the rotation angle (A).

FIG. 6A illustrates a zoom magnification that is stepwise determined depending on the rotation angle (A). Referring to FIG. 6A, when the zoom dial 102 is rotated to an angle of 45 degree, 90 degree, or 180 degree, the zoom magnification is stepwise determined to be 1.5 times, 2 times, or 3 times, respectively.

FIG. 6B illustrates a zoom magnification that is linearly determined depending on the rotation angle (A). Referring to FIG. 6B, when the zoom dial 102 is rotated to the angle of 0 degree to 180 degree, the zoom magnification is linearly determined to be 1 to 3 times.

FIGS. 6A and 6B illustrate the maximal zoom magnification of three times, for example. However, even though a maximal zoom magnification is more or less than three times, the rotation angle (A) can be divided into fine sections or coarse sections to provide as much zoom magnification as required.

As described above, in the present invention, the acceleration sensor is used to perform the camera zoom-in or out depending on the rotation angle of the zoom dial, thereby enabling a convenient and prompt camera zoom function, and preventing lens shaking that is commonly caused when the zoom function is performed by pressing keys.

Further, the present invention enables the user to implement the camera zoom function of the mobile communication terminal in a more convenient manner, thereby enabling the improving the mobile communication terminal of the present invention over the conventional digital camera in a competitive market.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A camera zoom device for a mobile communication terminal, comprising: a zoom dial that is rotatable about a rotation axis;
    a zoom dial rotation sensing unit for sensing a rotation angle of the zoom dial, based on a variation gravitational acceleration, the sensing unit having an acceleration sensor;
    a zoom controlling unit for determining a zoom direction and a zoom magnification, depending on the sensed rotation angle; and a zoom lens driving unit for driving a zoom lens unit, depending on the zoom direction and the zoom magnification.

2. The device of claim 1, wherein the acceleration sensor is for sensing a rotation sensing unit comprises an
    Analog-to-digital converter for converting an analog rotation angle to a digital rotation angle.

3. The device of claim 1, wherein the zoom dial is formed using a partial body of the mobile communication terminal.

4. The device of claim 1, wherein the zoom controlling unit stepwise determines the zoom magnification, depending on the rotation angle of the zoom dial.

5. The device of claim 1, wherein the zoom controlling unit linearly determines the zoom magnification, depending on the rotation angle of the zoom dial.

6. A camera zoom method for a mobile communication terminal, comprising the steps of: sensing a rotation angle of a zoom dial, based on a variation gravitational acceleration with an acceleration sensor;

calculating a zoom direction and a zoom magnification, using the rotation angle; and driving a zoom lens unit based on the calculated zoom direction and zoom magnification.

7. The method of claim 6, wherein the zoom magnification is stepwise determined depending on the rotation angle of the zoom dial.

8. The method of claim 6, wherein the zoom magnification is linearly determined depending on the rotation angle of the zoom dial.

* * * * *